US011388439B2

(12) United States Patent
Massimino et al.

(10) Patent No.: US 11,388,439 B2
(45) Date of Patent: Jul. 12, 2022

(54) SPARSE MATRIX REPRESENTATION USING A BOUNDARY OF NON-ZERO COEFFICIENTS

(71) Applicant: Google LLC, Mountain View, CA (US)

(72) Inventors: Pascal Massimino, Orsay (FR); Vincent Rabaud, Paris (FR)

(73) Assignee: GOOGLE LLC, Mountain View, CA (US)

( * ) Notice: Subject to any disclaimer, the term of this patent is extended or adjusted under 35 U.S.C. 154(b) by 132 days.

(21) Appl. No.: 16/726,408

(22) Filed: Dec. 24, 2019

(65) Prior Publication Data
US 2021/0120270 A1 Apr. 22, 2021

Related U.S. Application Data

(60) Provisional application No. 62/924,108, filed on Oct. 21, 2019.

(51) Int. Cl.
| | |
|---|---|
| *H04N 19/60* | (2014.01) |
| *H04N 19/124* | (2014.01) |
| *H04N 19/129* | (2014.01) |
| *H04N 19/176* | (2014.01) |
| *H04N 19/423* | (2014.01) |
| *H04N 19/70* | (2014.01) |

(52) U.S. Cl.
CPC .......... *H04N 19/60* (2014.11); *H04N 19/124* (2014.11); *H04N 19/129* (2014.11); *H04N 19/176* (2014.11); *H04N 19/423* (2014.11); *H04N 19/70* (2014.11)

(58) Field of Classification Search
CPC ..... H04N 19/60; H04N 19/124; H04N 19/129

USPC .................................................. 375/240.18
See application file for complete search history.

(56) References Cited

U.S. PATENT DOCUMENTS

| | | | |
|---|---|---|---|
| 2012/0287989 A1 | 11/2012 | Budagavi et al. | |
| 2017/0034530 A1* | 2/2017 | Cherepanov | ......... H04N 19/122 |
| 2017/0134530 A1 | 5/2017 | Neway | |

FOREIGN PATENT DOCUMENTS

WO 2017019649 A1 2/2017

OTHER PUBLICATIONS

Bankoski, et al., "Technical Overview of VP8, An Open Source Video Codec for the Web", Jul. 11, 2011, 6 pp.
(Continued)

*Primary Examiner* — On S Mung
(74) *Attorney, Agent, or Firm* — Young Basile Hanlon & MacFarlane, P.C.

(57) ABSTRACT

A sparse matrix representation of image or video data for encoding or decoding uses a boundary of non-zero coefficients within the image or video data. A bounding box encloses each non-zero coefficient within an image or video block. The coefficients enclosed within the bounding box are encoded to a bitstream along with dimensional information usable to identify the bounding box within the image or video block during decoding. Coefficients not enclosed within the bounding box are not specifically encoded within the bitstream. The dimensional information represents one or more of a shape, size, or position within the image or video block of the bounding box. The bounding box may be identified according to a scan order used to process the coefficients within the image or video block. The bounding box may be rectangular or non-rectangular.

20 Claims, 11 Drawing Sheets

(56) References Cited

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009, 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video. Advanced video coding for generic audiovisual services, Version 1, International Telecommunication Union, May 2003, 282 pp.
Series H: Audiovisual and Multimedia Systems, Infrastructure of audiovisual services—Coding of moving video. Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

\* cited by examiner

SPARSE MATRIX REPRESENTATION USING A BOUNDARY OF NON-ZERO COEFFICIENTS

CROSS-REFERENCE TO RELATED APPLICATION(S)

This disclosure claims the benefit of U.S. Provisional Application No. 62/924,108, filed Oct. 21, 2019, the disclosure of which is hereby incorporated by reference in its entirety.

BACKGROUND

Image content represents a significant amount of online content. A web page may include multiple images, and a large portion of the time and resources spent rendering the web page are dedicated to rendering those images for display. The amount of time and resources required to receive and render an image for display depends in part on the manner in which the image is encoded. As such, an image, and therefore a web page that includes the image, can be rendered faster by reducing the total data size of the image. Various approaches have been proposed to reduce the total data size of images, including encoding or decoding techniques.

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

Disclosed herein are, inter alia, systems and techniques for image or video coding using sparse matrix representation using a boundary of non-zero coefficients.

A method for encoding an image block according to an implementation of this disclosure includes: transforming data of the image block to produce transformed image data; quantizing the transformed image data to produce quantized image data, wherein the quantized image data includes coefficients arranged in a two-dimensional matrix; identifying a bounding box which encloses non-zero value coefficients of the quantized image data within the two-dimensional matrix, wherein zero value coefficients of the quantized image data are located outside of the bounding box within the two-dimensional matrix; entropy encoding the non-zero value coefficients enclosed within the bounding box to an encoded bitstream; and including dimensional information of the bounding box in the encoded bitstream.

A method for decoding an encoded image block according to an implementation of this disclosure includes: decoding dimensional information of a bounding box from an encoded bitstream including the encode image block; decoding syntax elements representative of the encoded image block from an encoded bitstream using the dimensional information, wherein the syntax elements correspond to non-zero value coefficients of image data enclosed within the bounding box during an encoding of the image data, wherein the syntax elements are arranged other than in a two-dimensional matrix format; dequantizing the syntax elements to produce transformed image data, wherein the transformed image data includes coefficients arranged in a two-dimensional matrix; inverse transforming the transformed image data to produce decoded image data; and outputting the decoded image data for storage or display.

A method for encoding a video block according to an implementation of this disclosure includes: generating a prediction block for data of the video block; producing a prediction residual for the data of the video block using the prediction block; transforming the prediction residual to produce transform coefficients; quantizing the transform coefficients to produce quantized transform coefficients, wherein the quantized transform coefficients are arranged in a two-dimensional matrix; identifying a bounding box which encloses non-zero value coefficients of the quantized transform coefficients within the two-dimensional matrix, wherein zero value coefficients of the quantized transform coefficients are located outside of the bounding box within the two-dimensional matrix; entropy encoding the non-zero value coefficients enclosed within the bounding box to an encoded bitstream; and including dimensional information of the bounding box in the encoded bitstream.

A method for decoding an encoded video block according to an implementation of this disclosure includes: decoding dimensional information of a bounding box from an encoded bitstream including the encode image block; decoding syntax elements representative of the encoded video block from an encoded bitstream using the dimensional information, wherein the syntax elements correspond to non-zero value coefficients of video data enclosed within the bounding box during an encoding of the video data, wherein the syntax elements are arranged other than in a two-dimensional matrix format; dequantizing the syntax elements to produce transform coefficients, wherein the transform coefficients include coefficients arranged in a two-dimensional matrix; inverse transforming the transform coefficients to produce a prediction residual; reconstructing the prediction residual to produce a decoded video block; and outputting the decoded video block for storage or display.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
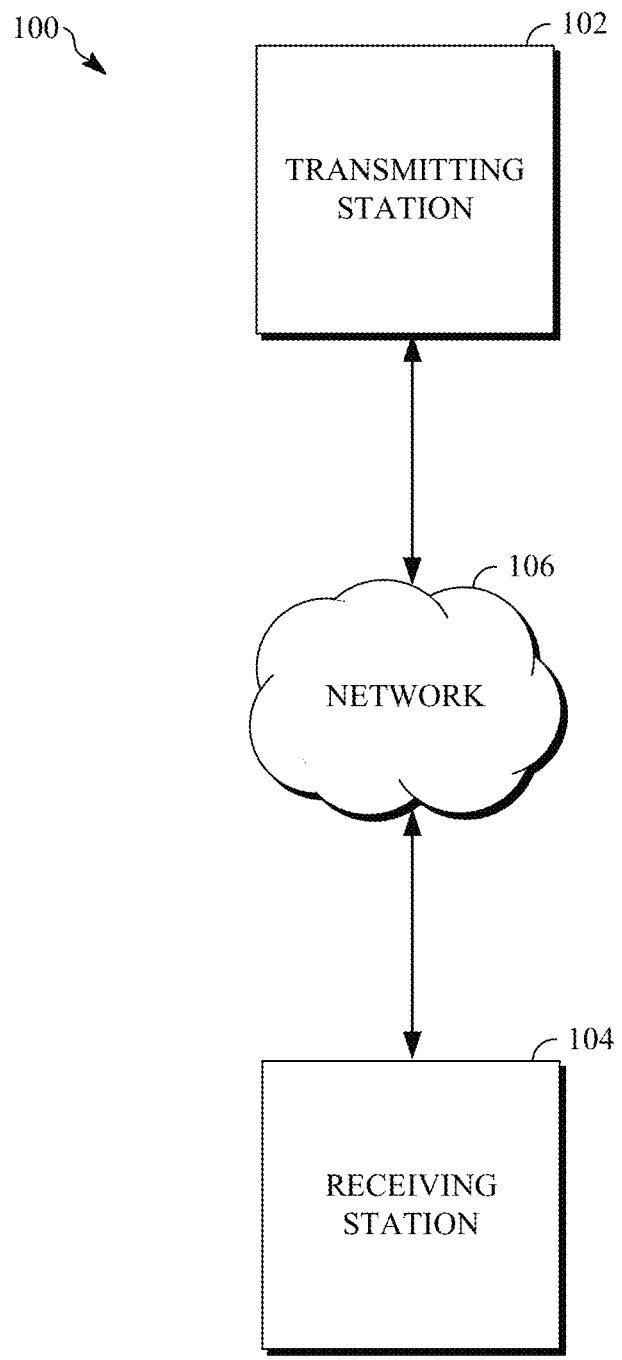
FIG. 1 is a block diagram of an example of an image or video coding system.

Image and video compression schemes include breaking respective images or video frames into smaller portions, such as blocks, and generating an output bitstream using techniques to limit the information included for respective blocks in the output. A n encoded bitstream can be decoded to re-create the source images or video frames from the limited information. Image or video data to be encoded to an encoded bitstream, or following decoding from an encoded bitstream, is typically expressed using coefficients arranged in a two-dimensional matrix format. In at least some cases, the two-dimensional matrix of the coefficients may include some number of zero value coefficients. In many such cases, the zero value coefficients may be found along the top and/or bottom portions of the two-dimensional matrix.

Zero value coefficients typically do not indicate important information and thus may not be signaled, such as within an encoded bitstream. As such, compression efficiency may be improved by skipping at least some zero value coefficients. However, the particular arrangement of zero value coefficients may not be efficient for transmission within a two-dimensional matrix structure. For example, in situations in which the zero value coefficients are not grouped together, the zero value coefficients may be encoded to and subsequently decoded from an encoded bitstream, such as because it would be difficult or resource intensive to otherwise isolate only the non-zero coefficients.

Conventional approaches to improving transmission efficiency in this regard include transforming the two-dimensional matrix into a one-dimensional signal using a scan order pattern, such as raster order, zig zag order, or the like. However, in at least some cases, the scan order pattern may still not effectively enough group zero value coefficients and may therefore result in many zero value coefficients being encoded. Furthermore, the use of a scan order pattern alone to identify a location of a last non-zero coefficient according to the scan order pattern may require additional data to be signaled within the encoded bitstream, such as an end of block (EOB) message indicating the location of that last non-zero coefficient.

Implementations of this disclosure address problems such as these using sparse matrix representations of image or video data using a boundary of non-zero coefficients. A two-dimensional matrix representation of image or video frame data, such as data corresponding to a block of the image or video frame, is processed by identifying a bounding box for the non-zero coefficients of the block. The bounding box may have a rectangular shape. Alternatively, the bounding box may have a non-rectangular shape. For example, the bounding box may have a generally convex or concave shape on one or more sides. In another example, the bounding box may have a shape corresponding to a triangle, circle, rhombus, or other geometric structure. The coefficients located within the bounding box are encoded to an encoded bitstream, along with information usable by a decoder to identify the shape and/or location of the bounding box within the block during decoding. As such, coefficients located outside of the bounding box are not encoded to an encoded bitstream, thereby improving compression and computational efficiency.

Further details of techniques for image or video coding using sparse matrix representation using a boundary of non-zero coefficients are described herein with initial reference to a system in which such techniques can be implemented. FIG. 1 is a diagram of an example of an image or video coding system 100. The image or video coding system 100 includes a transmitting station 102, a receiving station 104, and a network 106. The image or video coding system 100 can be used, for example, to encode and decode some or all of an image or a video sequence.

The transmitting station 102 is a computing device that encodes and transmits an image. Alternatively, the transmitting station 102 may include two or more distributed devices for encoding and transmitting an image or a video sequence. The receiving station 104 is a computing device that receives and decodes an encoded image or an encoded video. Alternatively, the receiving station 104 may include two or more distributed devices for receiving and decoding an encoded image or an encoded video. A n example of a computing device used to implement one or both of the transmitting station 102 or the receiving station 104 is described below with respect to FIG. 2.

The network 106 connects the transmitting station 102 and the receiving station 104 for the encoding, transmission, receipt, and decoding of an image. The network 106 can be, for example, the Internet. The network 106 can also be a local area network (LAN), a wide area network (WAN), a virtual private network (VPN), a cellular telephone network, or another means of transferring the image from the transmitting station 102 to the receiving station 104.

Implementations of the coding system 100 may differ from what is shown and described with respect to FIG. 1. In some implementations, the image or video coding system 100 can omit the network 106. In some implementations, an image or a video stream can be encoded and then stored for transmission at a later time to the receiving station 104 or another device having memory. In some implementations, the receiving station 104 can receive (e.g., via the network 106, a computer bus, and/or some communication pathway) the encoded image or encoded video and store the encoded image or encoded video for later decoding. For example, a real-time transport protocol (RTP), a Hypertext Transfer Protocol-based (HTTP-based) video streaming protocol, or another protocol may be used for transmission of the encoded image or encoded video over the network 104.

In some implementations, the image or video coding system 100 may be used in a video conferencing system. For example, the transmitting station 102 and/or the receiving station 106 may include the ability to both encode and decode a video stream as described below. For example, the receiving station 106 could be a video conference device of a participant who receives an encoded video bitstream from a video conference server (e.g., the transmitting station 102) to decode and view and further encodes and transmits a video bitstream to the video conference server for decoding and viewing by other participants.

In some implementations, the functionality of the transmitting station 102 and of the receiving station 104 can change based on the particular operations performed. For example, during operations for encoding an image or video stream, the transmitting station 102 can be a computing device used to upload an image or video stream for encoding to a server, and the receiving station 104 can be the server that receives the image or video stream from the transmitting station 102 and encodes the image or video stream for later use. In another example, during operations for decoding an encoded image or encoded video, the transmitting station 102 can be a server that decodes the encoded image or encoded video, and the receiving station 104 can be a computing device that receives the decoded image or decoded video from the transmitting station 102 and renders the decoded image or decoded video.

Figure 2:
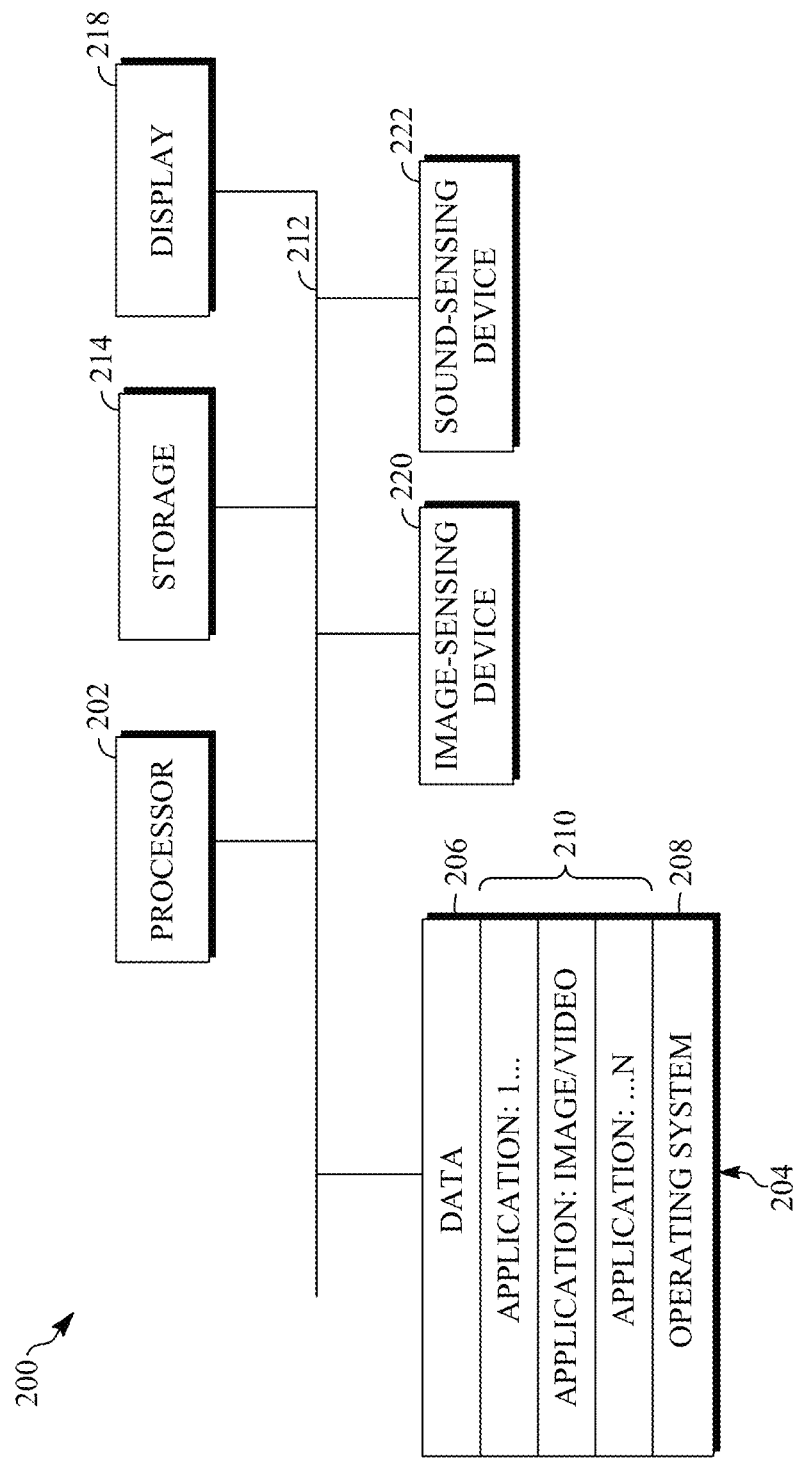
FIG. 2 is a block diagram of an example of an internal configuration of a computing device that can be used in an image or video coding system.

FIG. 2 is a block diagram of an example of an internal configuration of a computing device 200 that can be used in an image encoding and decoding system, for example, the image coding system 100 shown in FIG. 1. The computing device 200 may, for example, implement one or both of the transmitting station 102 or the receiving station 104. The computing device 200 can be in the form of a computing system including multiple computing devices, or in the form of one computing device, for example, a mobile phone, a tablet computer, a laptop computer, a notebook computer, a desktop computer, or the like.

A processor 202 in the computing device 200 can be a conventional central processing unit. Alternatively, the processor 202 can be another type of device, or multiple devices, now existing or hereafter developed, capable of manipulating or processing information. For example, although the disclosed implementations can be practiced with one processor as shown (e.g., the processor 202), advantages in speed and efficiency can be achieved by using more than one processor.

A memory 204 in the computing device 200 can be a read-only memory (ROM) device or a random-access memory (RAM) device in an implementation. However, other suitable types of storage devices can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include image or video encoding and/or decoding software that performs some or all of the techniques described herein. The computing device 200 can also include a secondary storage 214, which can, for example, be a memory card used with a mobile computing device. For example, an image can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or another image-sensing device, now existing or hereafter developed, which can sense an image such as the image of a user operating the computing device 200. The image-sensing device 220 can be positioned such that it is directed toward the user operating the computing device 200. For example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or another sound-sensing device, now existing or hereafter developed, which can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Implementations of the computing device 200 may differ from what is shown and described with respect to FIG. 2. In some implementations, the operations of the processor 202 can be distributed across multiple machines (wherein individual machines can have one or more processors) that can be coupled directly or across a local area or other network. In some implementations, the memory 204 can be distributed across multiple machines, such as a network-based memory or memory in multiple machines performing the operations of the computing device 200. In some implementations, the bus 212 of the computing device 200 can be composed of multiple buses. In some implementations, the secondary storage 214 can be directly coupled to the other components of the computing device 200 or can be accessed via a network and can comprise an integrated unit, such as a memory card, or multiple units, such as multiple memory cards.

Figure 3:
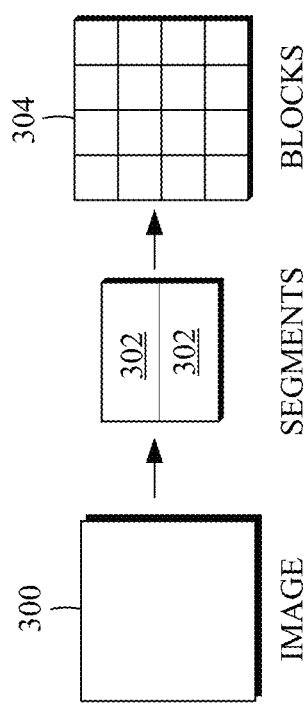
FIG. 3 is a diagram of an example of an image to be encoded and subsequently decoded.

FIG. 3 is a diagram of an example of an image 300 to be encoded and subsequently decoded. The image 300 can be divided into a series of planes or segments 302. The segments 302 can be subsets of images that permit parallel processing, for example. The segments 302 can also or instead be subsets of images that can separate the image data into separate colors. For example, the image 300 color video data can include a luminance plane and two chrominance planes. The segments 302 may be sampled at different resolutions.

Whether or not the frame 300 is divided into segments 302, the image 300 may be further subdivided into blocks 304, which can contain data corresponding to, for example, 16×16 pixels in the image 300. The blocks 304 can also be arranged to include data from one or more segments 302 of pixel data. The blocks 304 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
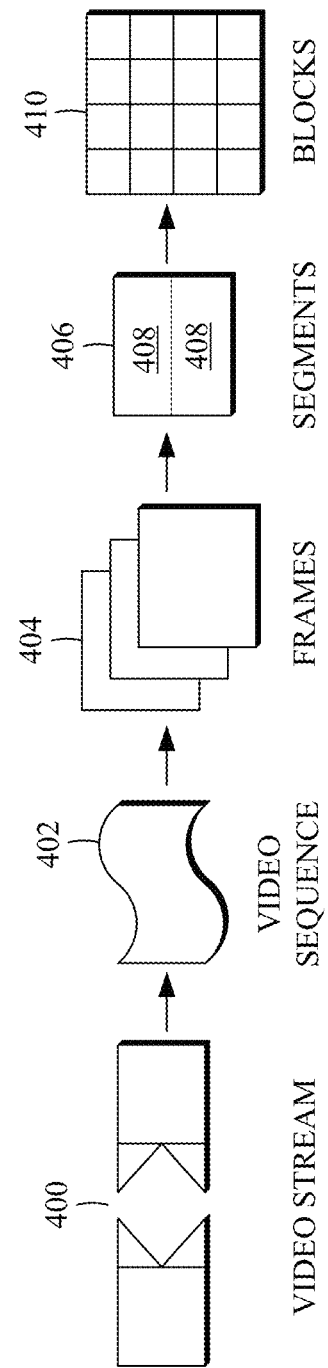
FIG. 4 is a diagram of an example of a video stream to be encoded and subsequently decoded.

FIG. 4 is a diagram of an example of a video stream 400 to be encoded and subsequently decoded. The video stream 400 includes a video sequence 402. At the next level, the video sequence 402 includes a number of adjacent frames 404. While three frames are depicted as the adjacent frames 404, the video sequence 402 can include any number of adjacent frames 404. The adjacent frames 404 can then be further subdivided into individual frames, for example, a frame 406.

At the next level, the frame 406 can be divided into a series of planes or segments 408. The segments 408 can be subsets of frames that permit parallel processing, for example. The segments 408 can also be subsets of frames that can separate the video data into separate colors. For example, a frame 406 of color video data can include a luminance plane and two chrominance planes. The segments 408 may be sampled at different resolutions.

Whether or not the frame 406 is divided into segments 408, the frame 406 may be further subdivided into blocks 410, which can contain data corresponding to, for example, 16×16 pixels in the frame 406. The blocks 410 can also be arranged to include data from one or more segments 408 of pixel data. The blocks 410 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 5:
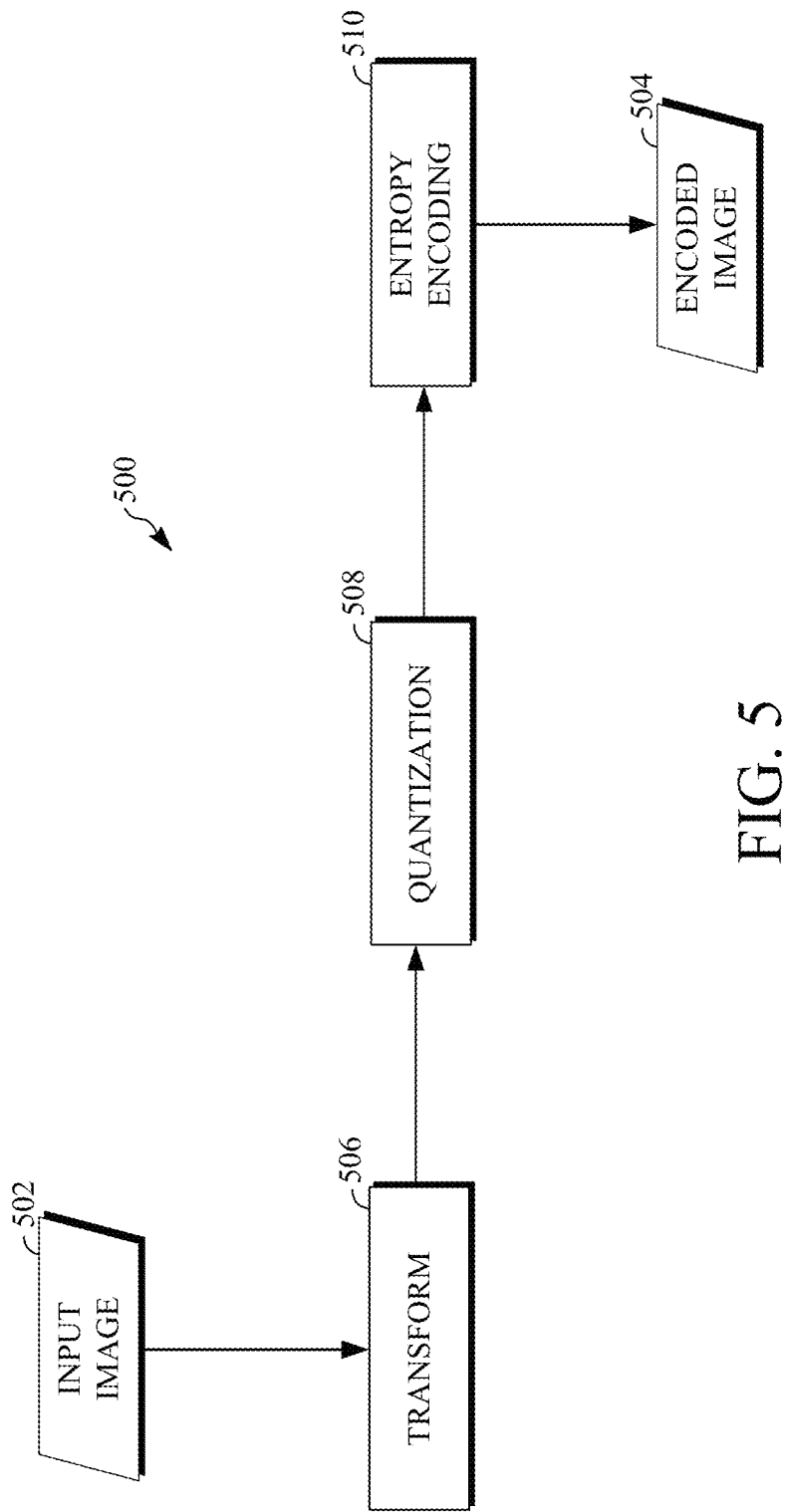
FIG. 5 is a block diagram of an example of an image encoder.

FIG. 5 is a block diagram of an example of an image encoder 500. FIG. 3 is a block diagram of an example of an image encoder 500. The image encoder 500 may, for example, be an image decoder implemented at a transmitting station of an image coding system, such as the transmitting station 102 of the image coding system 100 shown in FIG. 1. The image encoder 500 receives and encodes an input image 502 (e.g., the image 300 shown in FIG. 3) to produce an encoded image 504, which may be output to a decoder (e.g., implemented by a receiving station, such as the receiving station 104 shown in FIG. 1) or for storage.

The image encoder 500 includes a transform stage 506, a quantization stage 508, and an entropy encoding stage 510. The transform stage 506 transforms blocks of the input image 502 into the frequency domain. For example, the transform stage 506 can use a discrete cosine transform (DCT) to transform the blocks of the input image 502 from the spatial domain to the frequency domain. Alternatively, the transform stage 506 can use another Fourier-related transform or a discrete Fourier transform to transform the blocks of the input image 502 from the spatial domain to the frequency domain. As a further alternative, the transform stage 506 can use another block-based transform to transform the blocks of the input image 502 from the spatial domain to the frequency domain.

The quantization stage 508 quantizes transform coefficients produced as output by the transform stage 506. The quantization stage 508 converts the transform coefficients into discrete quantum values, which are referred to as quantized transform coefficients, using a quantization factor. For example, the transform coefficients may be divided by the quantization factor and truncated.

The entropy encoding stage 510 entropy encodes the quantized transform coefficients output from the quantization stage 508 using a lossy or lossless coding technique. For example, the lossless coding technique used by the entropy encoding stage 510 to entropy encode the quantized transform coefficients may be or include Huffman coding, arithmetic doing, variable length coding, or another coding technique. The encoded image 504 is produced based on the output of the entropy encoding stage 510. The encoded image 504 may be stored at a server (e.g., in a database or like data store) for later retrieval and decoding. For example, the encoded image 504 may be an image hosted on a website or an image provided for display on a webpage.

Figure 6:
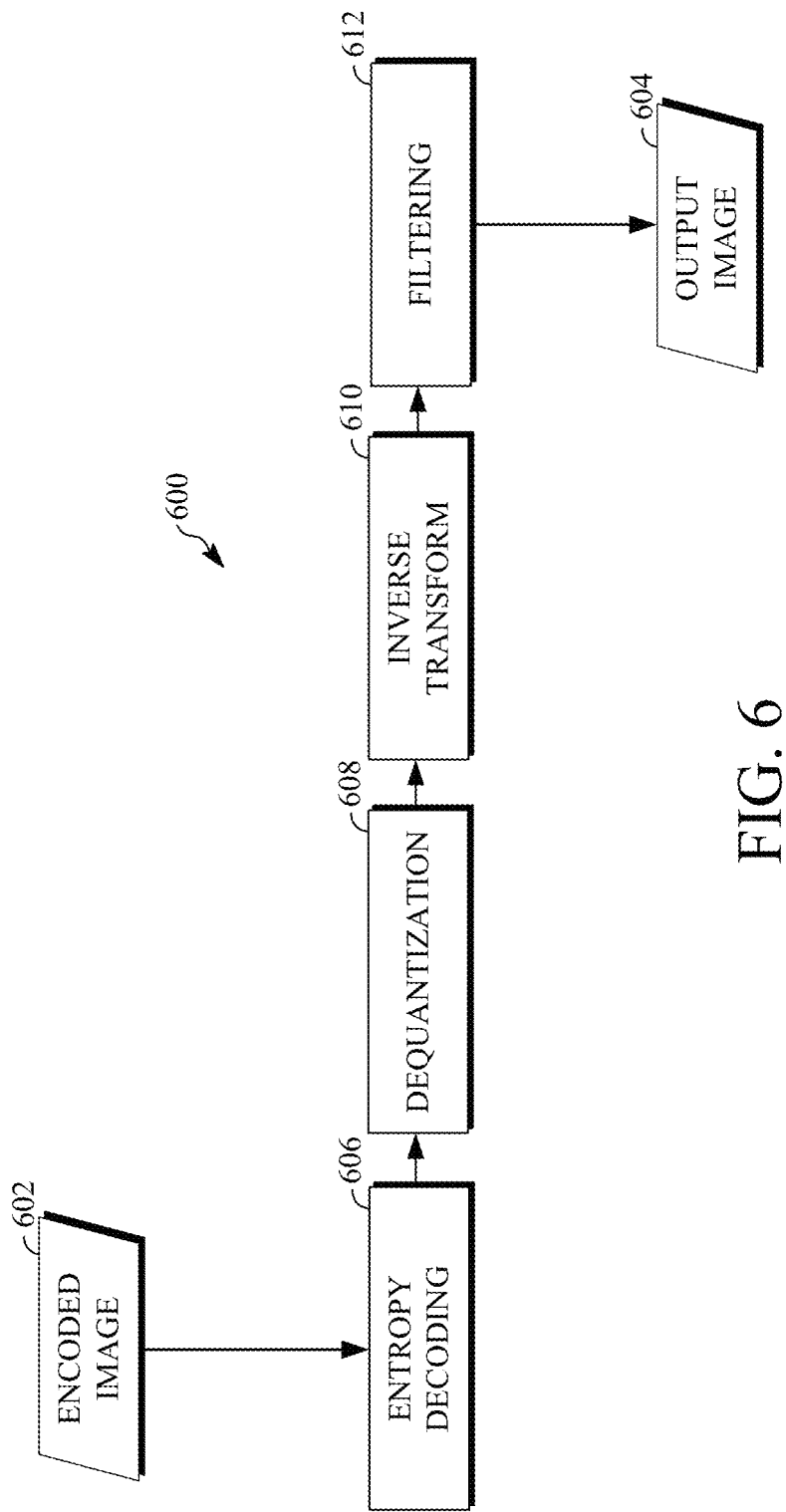
FIG. 6 is a block diagram of an example of an image decoder.

FIG. 6 is a block diagram of an example of an image decoder 600. The image decoder 600 may, for example, be an image decoder implemented at a receiving station of an image coding system, such as the receiving station 104 of the image coding system 100 shown in FIG. 1. The image decoder 600 receives and decodes an encoded image 602 (e.g., from storage or memory) to produce an output image 604, which may be output for display or storage. The output image 604 is perceptibly the same as or similar to an input image encoded using an encoder (e.g., the input image 502 and the image encoder 500 shown in FIG. 3). However, given that the encoding resulting in the encoded image 602 may be lossy, the output image 604 may look substantially the same as, but not necessarily be identical to, the input image.

The image decoder 600 includes an entropy decoding stage 606, a dequantization stage 608, an inverse transform stage 610, and a filtering stage 612. The entropy decoding stage 606 entropy decodes encoded image data from the encoded image 602 using a lossless coding technique. For example, the lossless coding technique used by the entropy decoding stage 606 to entropy decode the encoded image data from the encoded image 602 may be or include Huffman coding, arithmetic doing, variable length coding, or another coding technique.

The entropy decoding stage 606 entropy decodes the encoded image data to produce quantized transform coefficients. The dequantization stage 608 dequantizes the quantized transform coefficients output from the entropy decoding stage 606, such as by multiplying the quantized transform coefficients by a quantization factor used to produce the encoded image 602. The inverse transform stage 610 inverse transforms the dequantized transform coefficients, such as by inverse transforming the dequantized transform coefficients from the frequency domain to the spatial domain.

The filtering stage 612 performs filtering to remove artifacts resulting from the encoding of the encoded image 602. For example, the filtering stage 612 can filter the coefficients output from the inverse transform stage 610 for a block of the encoded image 602 according to a main filtering direction of the block.

Figure 7:
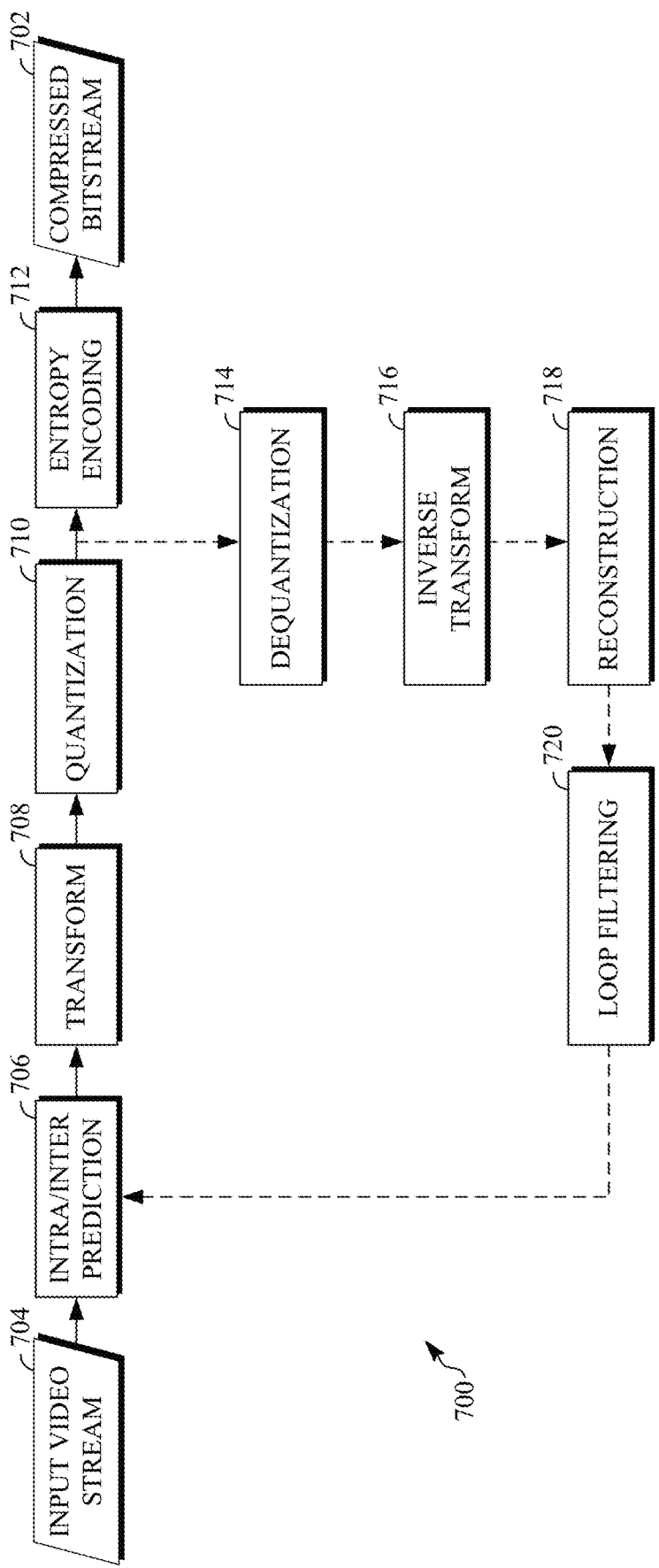
FIG. 7 is a block diagram of an example of a video encoder.

FIG. 7 is a block diagram of an example of a video encoder 700. The encoder 700 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 7. The encoder 700 can also be implemented as specialized hardware included in, for example, the transmitting station 102. In some implementations, the encoder 700 may be a hardware encoder.

The encoder 700 has the following stages to perform the various functions in a forward path (shown by the solid connection lines) to produce an encoded or compressed bitstream 702 using an input video stream 704 (e.g., the video stream 400 shown in FIG. 4) as input: an intra/inter prediction stage 706, a transform stage 708, a quantization stage 710, and an entropy encoding stage 712. The encoder 700 may also include a reconstruction path (shown by the dotted connection lines) to reconstruct a frame for encoding of future blocks. In FIG. 7, the encoder 700 has the following stages to perform the various functions in the reconstruction path: a dequantization stage 714, an inverse transform stage 716, a reconstruction stage 718, and a loop filtering stage 720. Other structural variations of the encoder 700 can be used to encode the video stream 300.

When the input video stream 704 is presented for encoding, respective adjacent frames can be processed in units of blocks. At the intra/inter prediction stage 706, respective blocks can be encoded using intra-frame prediction (also called intra-prediction) or inter-frame prediction (also called inter-prediction). In either case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 706 to produce a residual block (also called a residual). The transform stage 708 transforms the residual into transform coefficients in, for example, the frequency domain using block-based transforms. The quantization stage 710 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 712. The entropy-encoded coefficients, together with other information used to decode the block (which may include, for example, syntax elements such as used to indicate the type of prediction used, transform type, motion vectors, a quantizer value, or the like), are then output to the compressed bitstream 702. The compressed bitstream 702 can be formatted using various techniques, such as variable length coding (VLC) or arithmetic coding. The compressed bitstream 702 can also be referred to as an encoded video stream or encoded video bitstream, and the terms will be used interchangeably herein.

The reconstruction path (shown by the dotted connection lines) can be used to ensure that the encoder 700 and a decoder (e.g., the decoder 800 described below with respect to FIG. 8) use the same reference frames to decode the compressed bitstream 420. The reconstruction path performs functions that are similar to functions that take place during the decoding process (described below with respect to FIG. 8), including dequantizing the quantized transform coefficients at the dequantization stage 714 and inverse transforming the dequantized transform coefficients at the inverse transform stage 716 to produce a derivative residual block (also called a derivative residual).

At the reconstruction stage 718, the prediction block that was predicted at the intra/inter prediction stage 706 can be added to the derivative residual to create a reconstructed block. The loop filtering stage 720 can be applied to the reconstructed block to reduce distortion such as blocking artifacts. In some implementations, the loop filtering stage 720 can be replaced with another filtering stage.

Other variations of the encoder 700 can be used to encode the compressed bitstream 702. In some implementations, a non-transform based encoder can quantize the residual signal directly without the transform stage 708 for certain blocks or frames. In some implementations, an encoder can have the quantization stage 710 and the dequantization stage 714 combined in a common stage.

Figure 8:
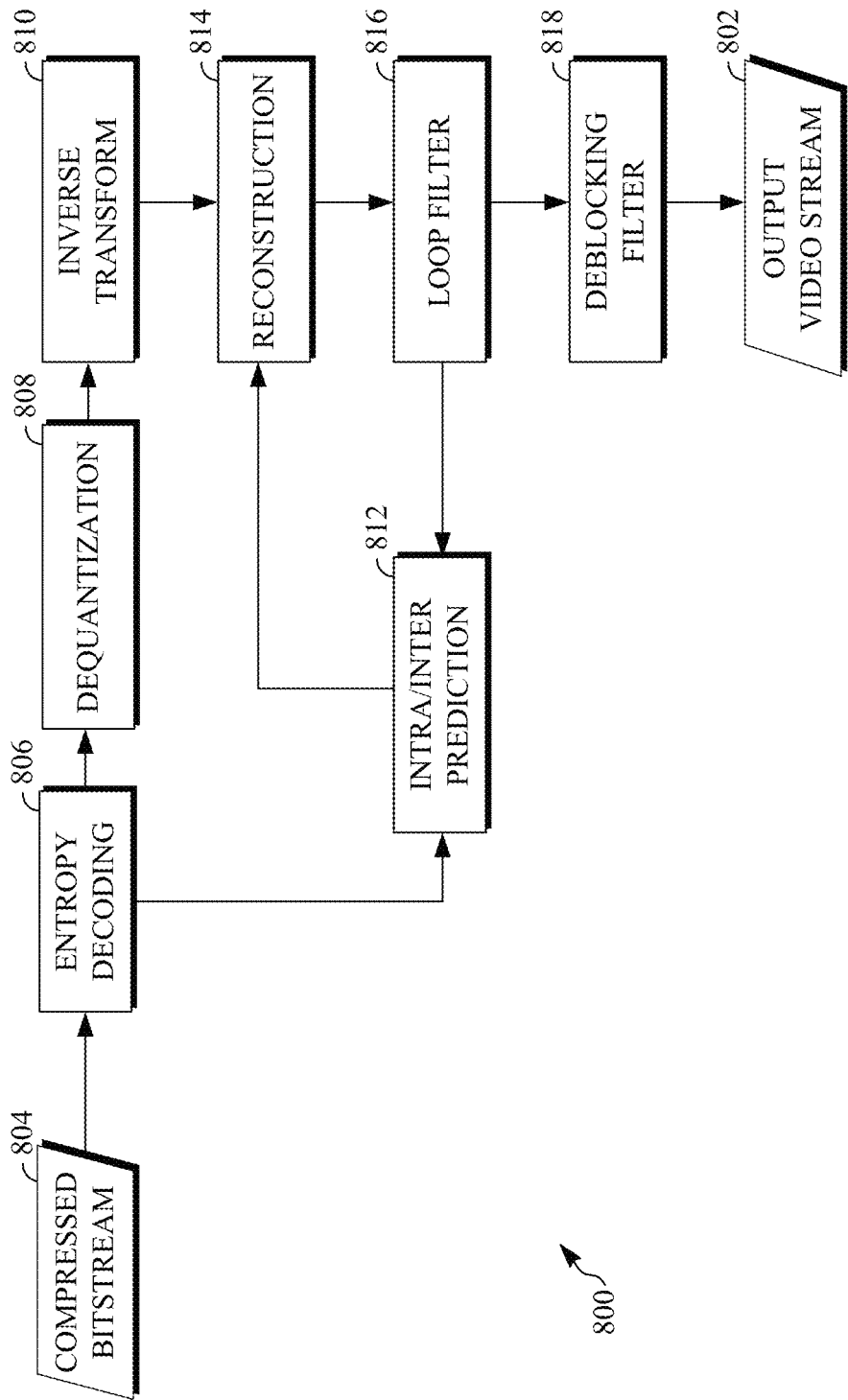
FIG. 8 is a block diagram of an example of a video decoder.

FIG. 8 is a block diagram of an example of a video decoder 800. The decoder 800 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 8. The decoder 800 can also be implemented in hardware included in, for example, the transmitting station 102 or the receiving station 106.

The decoder 800, similar to the reconstruction path of the encoder 700 shown in FIG. 7, includes in one example the following stages to perform various functions to produce an output video stream 802 from the compressed bitstream 804 (e.g., the compressed bitstream 702 shown in FIG. 7): an entropy decoding stage 806, a dequantization stage 808, an inverse transform stage 810, an intra/inter prediction stage 812, a reconstruction stage 814, a loop filtering stage 816, and a deblocking filtering stage 818. Other structural variations of the decoder 800 can be used to decode the compressed bitstream 804.

When the compressed bitstream 804 is presented for decoding, the data elements within the compressed bitstream 804 can be decoded by the entropy decoding stage 806 to produce a set of quantized transform coefficients. The dequantization stage 808 dequantizes the quantized transform coefficients (e.g., by multiplying the quantized transform coefficients by the quantizer value), and the inverse transform stage 810 inverse transforms the dequantized transform coefficients to produce a derivative residual that can be identical to that created by the inverse transform stage 716 in the encoder 700. Using header information decoded from the compressed bitstream 804, the decoder 800 can use the intra/inter prediction stage 812 to create the same prediction block as was created in the encoder 700 (e.g., at the intra/inter prediction stage 706).

At the reconstruction stage 814, the prediction block can be added to the derivative residual to create a reconstructed block. The loop filtering stage 816 can be applied to the reconstructed block to reduce blocking artifacts. In some implementations, the loop filtering stage 816 can be replaced with another filtering stage. Other filtering can also be applied to the reconstructed block. For example, the deblocking filtering stage 818 can be applied to the reconstructed block to reduce blocking distortion, and the result is output as the output video stream 802. The output video stream 802 can also be referred to as a decoded video stream, and the terms will be used interchangeably herein.

Other variations of the decoder 800 can be used to decode the compressed bitstream 804. In some implementations, the decoder 800 can produce the output video stream 802 without the deblocking filtering stage 818.

Figure 9:
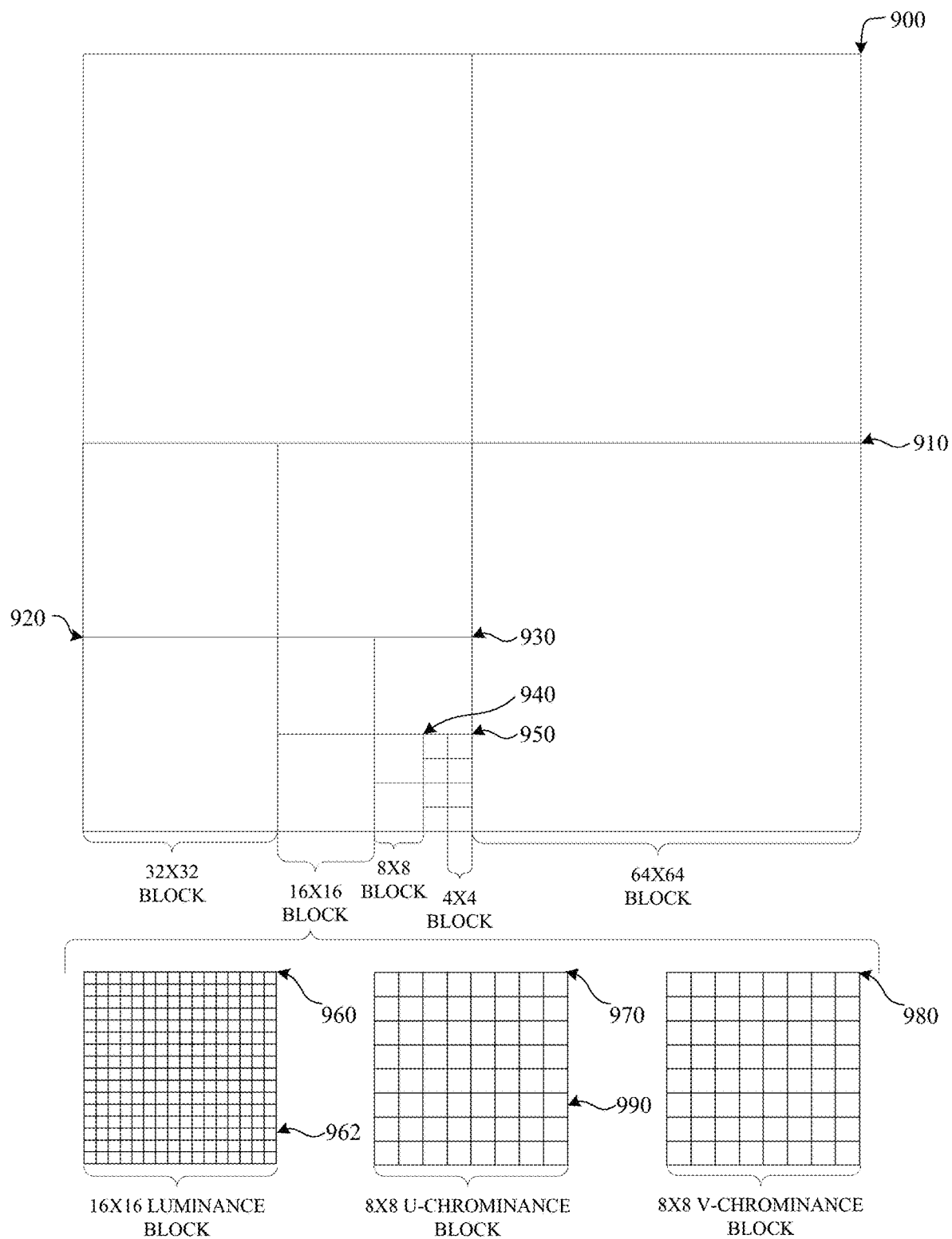
FIG. 9 is an illustration of examples of portions of an image or video frame.

FIG. 9 is an illustration of examples of portions of an image or video frame 900. As shown, the image or video frame 900 includes four 64B64 blocks 910, in two rows and two columns in a matrix or Cartesian plane. In some implementations, a 64B64 block may be a maximum coding unit, N=64. Each 64B64 block may include four 32B32 blocks 920. Each 32B32 block may include four 16B16 blocks 930. Each 16B16 block may include four 8B8 blocks 940. Each 8B8 block 940 may include four 4B4 blocks 950. Each 4B4 block 950 may include 16 pixels, which may be represented in four rows and four columns in each respective block in the Cartesian plane or matrix.

The pixels may include information representing an image captured in the image or video frame 900, such as luminance information, color information, and location information. In some implementations, a block, such as a 16B16 pixel block as shown, may include a luminance block 960, which may include luminance pixels 562; and two chrominance blocks 970, 980, such as a U or Cb chrominance block 970, and a V or Cr chrominance block 980. The chrominance blocks 970, 980 may include chrominance pixels 990. For example, the luminance block 960 may include 16B16 luminance pixels 962 and each chrominance block 970, 980 may include 8B8 chrominance pixels 990 as shown. Although one arrangement of blocks is shown, any arrangement may be used. Although FIG. 9 shows NBN blocks, in some implementations, NBM blocks may be used, wherein N and M are different numbers. For example, 32B64 blocks, 64B32 blocks, 16B32 blocks, 32B16 blocks, or any other size blocks may be used. In some implementations, NB2N blocks, 2NBN blocks, or a combination thereof, may be used.

In some implementations, coding the image or video frame 900 may include ordered block-level coding. Ordered block-level coding may include coding blocks of the image or video frame 900 in an order, such as raster-scan order, wherein blocks may be identified and processed starting with a block in the upper left corner of the image or video frame 900, or portion of the image or video frame 900, and proceeding along rows from left to right and from the top row to the bottom row, identifying each block in turn for processing. For example, the 64B64 block in the top row and left column of the image or video frame 900 may be the first block coded and the 64B64 block immediately to the right of the first block may be the second block coded. The second row from the top may be the second row coded, such that the 64B64 block in the left column of the second row may be coded after the 64B64 block in the rightmost column of the first row.

In some implementations, coding a block of the image or video frame 900 may include using quad-tree coding, which may include coding smaller block units within a block in raster-scan order. For example, the 64B64 block shown in the bottom left corner of the portion of the image or video frame 900 may be coded using quad-tree coding wherein the top left 32B32 block may be coded, then the top right 32B32 block may be coded, then the bottom left 32B32 block may be coded, and then the bottom right 32B32 block may be coded. Each 32B32 block may be coded using quad-tree coding wherein the top left 16B16 block may be coded, then the top right 16B16 block may be coded, then the bottom left 16B16 block may be coded, and then the bottom right 16B16 block may be coded.

Each 16B16 block may be coded using quad-tree coding wherein the top left 8B8 block may be coded, then the top right 8B8 block may be coded, then the bottom left 8B8 block may be coded, and then the bottom right 8B8 block may be coded. Each 8B8 block may be coded using quad-tree coding wherein the top left 4B4 block may be coded, then the top right 4B4 block may be coded, then the bottom left 4B4 block may be coded, and then the bottom right 4B4 block may be coded. In some implementations, 8B8 blocks may be omitted for a 16B16 block, and the 16B16 block may be coded using quad-tree coding wherein the top left 4B4 block may be coded, then the other 4B4 blocks in the 16B16 block may be coded in raster-scan order.

In some implementations, coding the image or video frame 900 may include encoding the information included in the original version of the image or video frame by, for example, omitting some of the information from that original version of the image or video frame from a corresponding encoded image or encoded video frame. For example, the coding may include reducing spectral redundancy, reducing spatial redundancy, or a combination thereof.

Reducing spectral redundancy may include using a color model based on a luminance component (Y) and two chrominance components (U and V or Cb and Cr), which may be referred to as the Y UV or Y CbCr color model, or color space. Using the Y UV color model may include using a relatively large amount of information to represent the luminance component of a portion of the image or video frame 900, and using a relatively small amount of information to represent each corresponding chrominance component for the portion of the image or video frame 900. For example, a portion of the image or video frame 900 may be represented by a high-resolution luminance component, which may include a 16B16 block of pixels, and by two lower resolution chrominance components, each of which represents the portion of the image as an 8B8 block of pixels. A pixel may indicate a value, for example, a value in the range from 0 to 255, and may be stored or transmitted using, for example, eight bits. Although this disclosure is described in reference to the Y UV color model, another color model may be used.

Reducing spatial redundancy may include transforming a block into the frequency domain using, for example, a discrete cosine transform. For example, a unit of an encoder, such as the transform stage 506 shown in FIG. 5 or the transform stage 708 shown in FIG. 7, may perform a discrete cosine transform using transform coefficient values based on spatial frequency.

Although described herein with reference to matrix or Cartesian representation of the image or video frame 900 for clarity, the image or video frame 900 may be stored, transmitted, processed, or a combination thereof, in a data structure such that pixel values may be efficiently represented for the image or video frame 900. For example, the image or video frame 900 may be stored, transmitted, processed, or any combination thereof, in a two-dimensional data structure such as a matrix as shown, or in a one-dimensional data structure, such as a vector array.

Furthermore, although described herein as showing a chrominance subsampled image where U and V have half the resolution of Y, the image or video frame 900 may have different configurations for the color channels thereof. For example, referring still to the Y UV color space, full resolution may be used for all color channels of the image or video frame 900. In another example, a color space other than the Y UV color space may be used to represent the resolution of color channels of the image or video frame 900.

Figure 10:
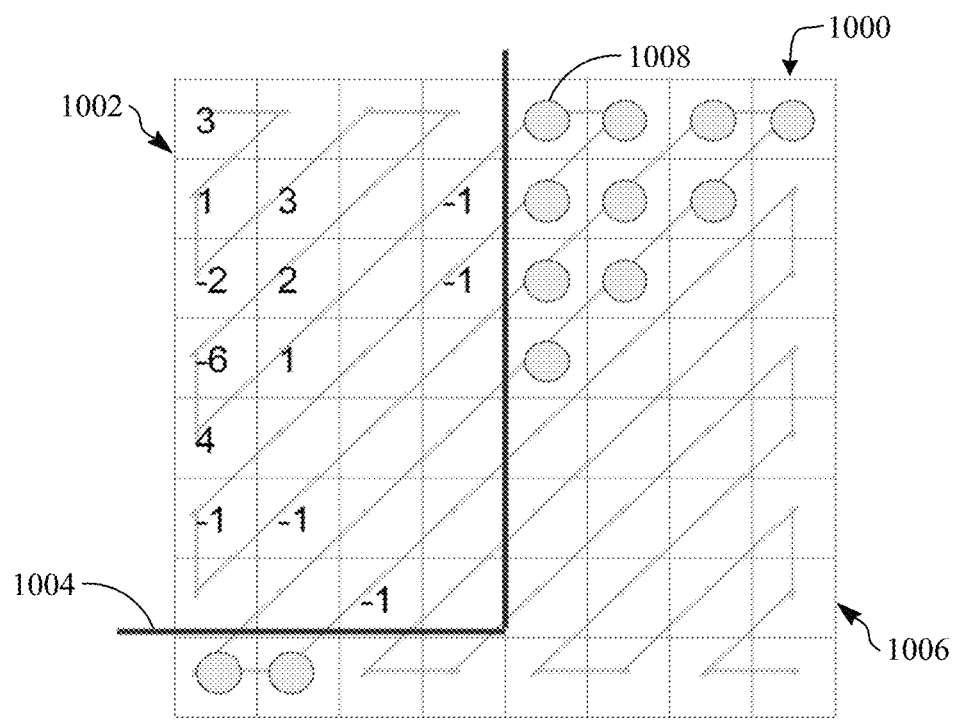
FIGS. 10-11 are illustrations of examples of a sparse matrix representation of an image or video block using a boundary of non-zero coefficients.
Figure 11:
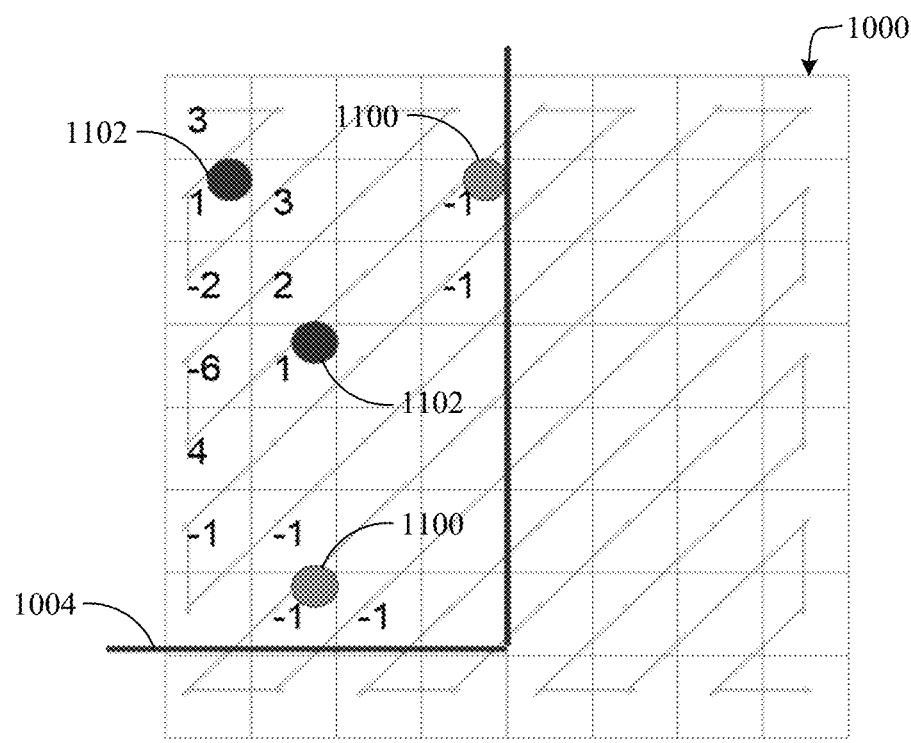

Example illustrations of a boundary of non-zero coefficients used for sparse matrix representation of an image or video block are now described with respect to FIGS. 10-11. Sparse matrix representation using a boundary of non-zero coefficients refers to image or video coding using a bounding box which indicates or otherwise represents non-zero value coefficients within a block of an image or a video frame. At an encoder, the non-zero value coefficients enclosed by the bounding box are encoded within an encoded bitstream. The remaining coefficients are zero value coefficients outside of the bounding box and are not specifically encoded within the encoded bitstream. For example, the remaining coefficients may be represented in the encoded bitstream by a run of zero values. In another example, the remaining coefficients may be entirely omitted from the encoded bitstream. Dimensional information indicating a shape, size, and/or location of the bounding box with respect to coefficients of the subject block is also encoded within the encoded bitstream. For example, the dimensional information may be encoded to a block header of the subject block. Later, at a decoder, the encoded non-zero value coefficients are decoded from the encoded bitstream. The decoder uses the dimensional information to determine the coefficients on which to spend computing resources, such as because those coefficients are enclosed by the bounding box and thus include non-zero value coefficients. The decoder determines that the remaining coefficients of the block are zero value coefficients. The decoder may determine that the remaining coefficients are zero value coefficients independent of data encoded within the encoded bitstream or based on data encoded within the encoded bitstream.

Referring first to FIG. 10, a block 1000 is shown. The block 1000 may be a block of an image (e.g., the image 300 shown in FIG. 3) or of a video frame (e.g., the video frame 406 shown in FIG. 4). The block 1000 includes coefficients 1002 which are enclosed by a bounding box indicated by boundary 1004 and coefficients 1006 which are outside of the boundary 1004 and thus outside of the bounding box. The block 1000 may therefore be considered as a two-dimensional matrix of coefficients. The coefficients 1002 include non-zero value coefficients and may in some cases also include zero value coefficients. The coefficients 1006 are limited to zero value coefficients. A symbol 1008 represents some of the coefficients 1006 which are outside of the bounding box.

Coding the block 1000 includes encoding and subsequently decoding the coefficients 1002 since they are enclosed by the bounding box. However, the coefficients 1006 are not encoded and subsequently decoded since they are outside of the bounding box. For example, a run of zero values can instead be encoded to and subsequently decoded from an encoded bitstream to indicate the number of the coefficients 1006 in the block 1000.

Dimensional information for the bounding box is included within the encoded bitstream. For example, the dimensional information may be, include, or otherwise refer to information indicating a shape of the bounding box, such as based on the portion of the two-dimensional matrix corresponding to the block 1000 over which the bounding box is located. In another example, the dimensional information may be, include, or otherwise refer to information indicating one or more dimensions of the bounding box. For example, information indicating the one or more dimensions can indicate one or more of a width or a height of the bounding box. In some cases, such as where the bounding box is non-rectangular, the information indicating the one or more dimensions can indicate multiple widths and/or multiple heights, such as to indicate dimensional changes throughout the shape of the bounding box. In yet another example, the dimensional information may be, include, or otherwise refer to information indicating a location of the bounding box within the block. For example, the information indicating the location of the bounding box may by default indicate that the bounding box starts at a top-left most position of the two-dimensional matrix representation corresponding to the block. In another example, the information indicating the location of the bounding box may indicate that the bounding box starts and/or ends at other places within the block. In some implementations, the dimensional information for the bounding box may be, include, or otherwise refer to information indicating a combination of a shape of the bounding box, one or more dimensions of the bounding box, and/or a location of the bounding box within the block.

The dimensional information may correspond to coordinates within two-dimensional matrix representation of the block, for example, along X and Y axes. In some implementations, the dimensional information included within the encoded bitstream indicates the complete size, shape, and/or location of the bounding block. In some implementations, the dimensional information included within the encoded bitstream indicates a partial size, shape, and/or location of the bounding block.

In some implementations, the dimensional information included within the encoded bitstream may be represented using coded syntax element values. For example, a set of coded syntax element values may be defined for a shape (e.g., rectangle, rhombus, circle, triangle, or another geometric structure), in which case the encoding of that set of coded syntax element values indicates a bounding box of the defined shape to the decoder. In another example, a set of syntax element values may be defined for a height and/or a width, in which case the encoding of that set of coded syntax element values indicates the height and/or width of the bounding box to the decoder. In yet another example, a set of coded syntax may be defined for a starting and/or ending location within a block, in which case the encoding of that set of coded syntax element values indicates the starting and/or ending location of the bounding box within the block to the decoder. In some implementations, a syntax element such as a binary flag can be used to signal whether a bounding box is used. In some such implementations, a decoder may check the value of that flag before proceeding to process a corresponding encoded block using a bounding box.

In some implementations, dimensional information for the bounding box may be omitted from the encoded bitstream. In some such implementations, the decoder which later decodes the encoded block corresponding to the bounding box may rely upon default configurations or determine or otherwise identify the bounding box with respect to the coefficients of the encoded block. For example, the default configurations may indicate that the bounding box has a height equal to a height of the encoded block. In another example, the default configurations may indicate that the bounding box has a width equal to a width of the encoded block. In yet another example, the default configurations may indicate to identify a height and/or a width of the bounding box based on an X-Y position of a last non-zero value coefficient within the encoded block.

In some implementations, an adaptive bit can be included in the bitstream for some or all of the coefficients 1002 and/or for some or all of the coefficients 1006 to indicate whether such coefficients are enclosed within the bounding box associated with the boundary 1004. For example, the adaptive bit can be a binary random variable having probabilities which are updated with each occurrence of zero value coefficients and/or non-zero value coefficients. In some implementations, adaptive bits can be used to indicate a run of zero values for the coefficients 1006. For example, if fewer than five consecutive zero value coefficients 1006 are present, the adaptive bits can be used to indicate those coefficients 1006. However, if five to sixteen consecutive zero value coefficients 1006 are present, the number of zeros can be encoded using a syntax element within the image or video frame header corresponding to the block 1000. Further, if more than sixteen consecutive zero value coefficients 1006 are present, those zero value coefficients 1006 may be entropy encoded using, for example, a Golomb representation.

Referring next to FIG. 11, the block 1000 is again shown with symbols 1100 and symbols 1102. The symbols 1100 represent locations along a scan order pattern (e.g., the zig zag pattern as shown in FIGS. 10-11) in which the pattern has crossed into both sides of the boundary 1004. The symbols 1100 are used to indicate EOB locations for the coefficients enclosed within the bounding box corresponding to the boundary 1004. The symbols 1102 represent locations along the scan order pattern after which all coefficients are non-zero value coefficients. The symbols 1100 and the symbols 1102 can be included in an encoded bitstream to which the block 1000 is encoded, along with the locations thereof.

In some implementations, the bounding box used in connection with the encoding of the block 1000 may enclose information other than coefficients. For example, the bounding box may be used during encoding to enclose other numerical information representative of image or video data. In some such implementations, such as where the numerical information enclosed using the bounding box is produced before processing the information using a scan order, other iterations may be performed to identify the bounding box. For example, the other iterations may perform the same or similar operations to scan order processing, such as described below with respect to FIG. 12.

Figure 12:
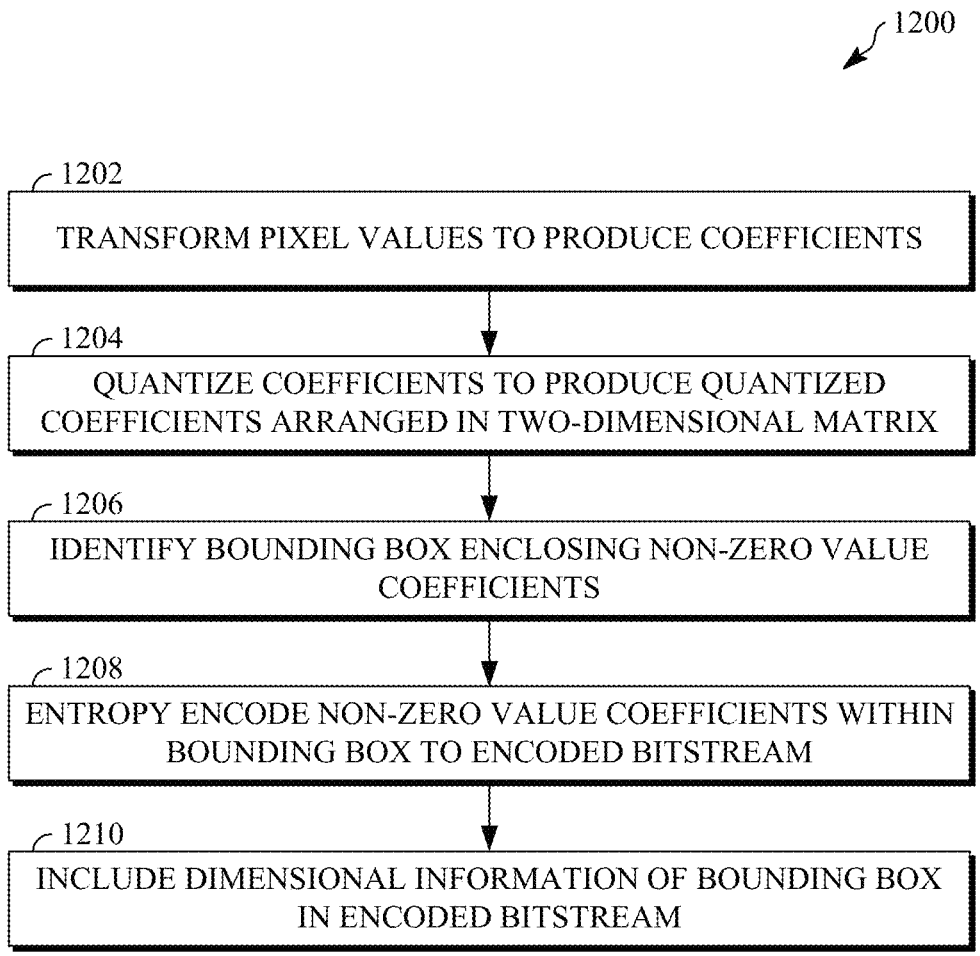
FIG. 12 is a flowchart diagram of an example of a technique for encoding an image or video block using sparse matrix representation using a boundary of non-zero coefficients.
Figure 13:
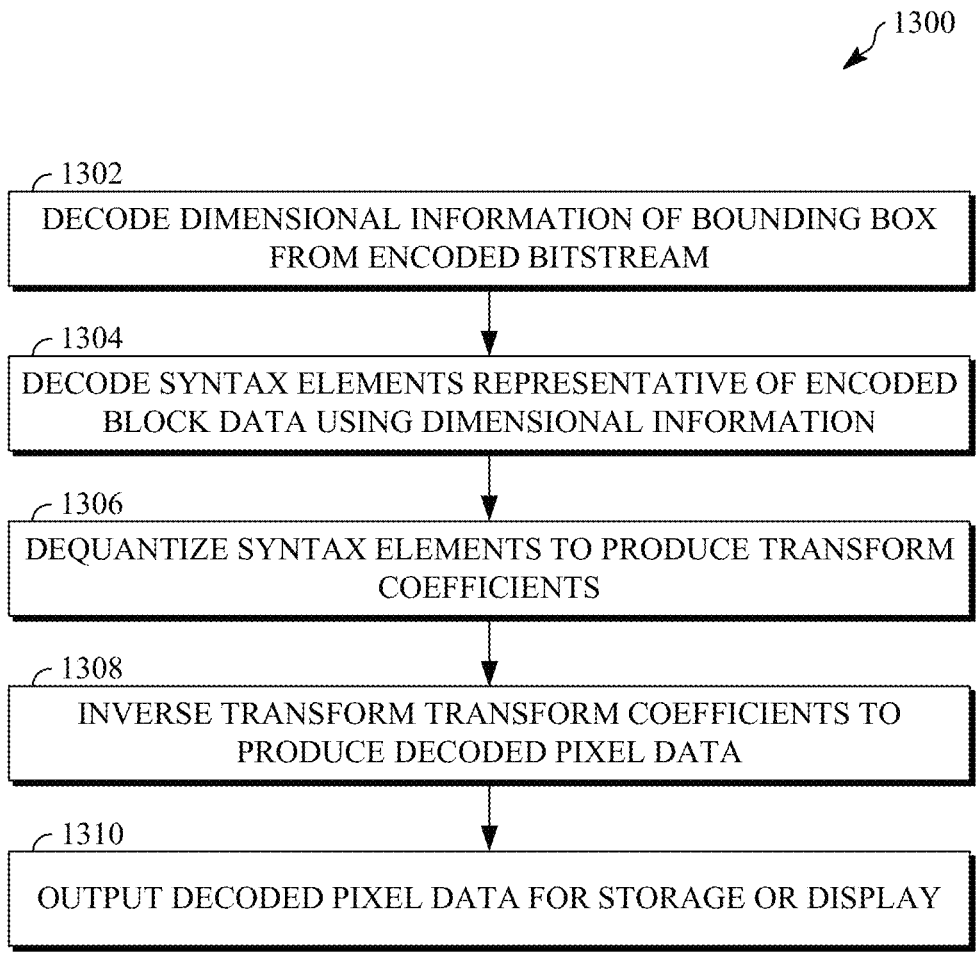
FIG. 13 is a flowchart diagram of an example of a technique for decoding an encoded image or video block using sparse matrix representation using a boundary of non-zero coefficients.

Techniques for sparse matrix representation using a boundary of non-zero coefficients are now described with respect to FIGS. 12-13. FIG. 12 is a flowchart diagram of an example of a technique 1200 for encoding an image or video block using sparse matrix representation using a boundary of non-zero coefficients. FIG. 13 is a flowchart diagram of an example of a technique 1300 for decoding an encoded image or video block using sparse matrix representation using a boundary of non-zero coefficients.

One or more of the technique 1200 or the technique 1300 can be implemented, for example, as a software program that may be executed by computing devices such as the transmitting station 102 or the receiving station 104. For example, the software program can include machine-readable instructions that may be stored in a memory such as the memory 204 or the secondary storage 214, and that, when executed by a processor, such as the processor 202, may cause the computing device to perform one or more of the technique 1200 or the technique 1300. One or more of the technique 1200 or the technique 1300 can be implemented using specialized hardware or firmware. As explained above, some computing devices may have multiple memories or processors, and the operations described in one or more of the technique 1200 or the technique 1300 can be distributed using multiple processors, memories, or both.

For simplicity of explanation, the technique 1200 and the technique 1300 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 12, a flowchart diagram of the example of the technique 1200 for encoding a current block (e.g., an image block of an image being encoded, or a video block of a video frame being encoded) using sparse matrix representation using a boundary of non-zero coefficients is shown. At 1202, pixel values are transformed to produce coefficients. The pixel values may be pixel values before or after prediction is performed. As such, in some cases, the pixel values may be or otherwise refer to values of a prediction residual.

At 1204, the coefficients are quantized to produce quantized transform coefficients. The quantized transform coefficients are arranged in a two-dimensional matrix representation. For example, the two-dimensional matrix may include or otherwise be expressed as a transform block corresponding to the current block. In some implementations, the two-dimensional matrix may include or otherwise be expressed as multiple transform blocks.

At 1206, a bounding box used to enclose non-zero value coefficients of the quantized transform coefficients is identified. Identifying the bounding box can include locating the non-zero value coefficients along a scan order. There may be a number of scan orders available for scanning the quantized transform coefficients. For example, a scan order may scan the quantized transform coefficients on a row-by-row basis starting at the top of a transform block corresponding to the current block (e.g., raster or horizontal scan) or on a column-by-column basis starting at the left side of such a transform block (e.g., vertical scan). In another example, the scan order may process the coefficients in directions that are not exactly horizontal or vertical (e.g., diagonal scan, zig-zag scan, etc.).

Whereas typical scan order processing converts the two-dimensional matrix of the quantized transform coefficients into a one-dimensional sequence by iterating through coefficients in a particular order, set by the pattern of the scan order used, the scan order processing used to identify the bounding box includes iterating through the quantized transform coefficients to identify the non-zero coefficients of the current block. For example, the locations of the non-zero coefficients can be identified within the current block. In some implementations, an end of block flag indicating a location of a last non-zero coefficient along the scan order pattern may also be identified.

The bounding box is identified according to the non-zero coefficients. As such, dimensional information of the bounding box, which represents a shape of the bounding box, a size of the bounding box, and/or a position of the bounding box within the two-dimensional matrix representation corresponding to the current block, is determined according to the locations of the non-zero value coefficients within the two-dimensional matrix representation of the current block. For example, the locations of the non-zero coefficients within the current block as identified along the scan order indicate the boundaries of the bounding box, in which each of the non-zero coefficients is enclosed within the bounding box. In some cases, the bounding box will enclose only non-zero value coefficients. In other cases, the bounding box will enclose both non-zero value coefficients and one or more zero value coefficients.

The size of the bounding box is considered. A smaller bounding box generally will result in a better compression performance than a larger bounding box, such as because the smaller bounding box encloses a lower total number of coefficients than the larger bounding box. As such, where it is possible to exclude zero value coefficients from enclosure within the bounding box, such that the resulting bounding box will be smaller than it would be had it included those zero value coefficients, the boundaries of the bounding box will be arranged to effectuate such exclusion.

At 1208, the non-zero value coefficients enclosed within the bounding box are entropy encoded to an encoded bitstream. Entropy encoding the non-zero value coefficients to the encoded bitstream includes processing the non-zero value coefficients enclosed within the bounding box according to their order in the scan order pattern. For example, after the operations for identifying the bounding box are performed, the scan order is used to convert the two-dimensional matrix of quantized transform coefficients of the current block into a one-dimensional sequence. In another example, the scan order can be used to convert the two-dimensional matrix of quantized transform coefficients of the current block into a one-dimensional sequence during the performance of the operations for identifying the bounding box.

As part of the entropy encoding, zero value coefficients enclosed within the bounding box are also encoded to the bitstream. However, zero value coefficients not enclosed within the bitstream are not specifically entropy encoded to the bitstream. In some implementations, zero value coefficients not enclosed within the bitstream are skipped altogether such that the information encoded to the bitstream is limited to the coefficients enclosed within the bounding box and information usable by a decoder to identify the bounding box (e.g., the dimensional information described below). In some implementations, an adaptive bit, a syntax element, or a Golomb representation may be used to indicate a run of zero value coefficients within the bitstream, such as based on a size of the run of zero value coefficients. For example, a decoder can use the data indicating the run of zero value coefficients to reconstruct the current block by populating zero value coefficients in specific locations based on the data used to indicate run of zero value coefficients within the bitstream.

At 1210, the dimensional information of the bounding box is encoded within the encoded bitstream. Encoding the dimensional information within the encoded bitstream can include encoding the dimensional information, for example, to a block header for the current block, an image or video frame header of the image or video frame which includes the current block, or another portion of the bitstream. The dimensional information is encoded within the bitstream to indicate to a decoder which later receives the bitstream how to identify the bounding box for decoding the current block.

The operations for encoding the non-zero value coefficients enclosed within the bounding box to the bitstream and for encoding the dimensional information within the bitstream are described with respect to the technique 1200 as being separate operations. However, in some implementations, the operations for encoding the non-zero value coefficients enclosed within the bounding box to the bitstream and for encoding the dimensional information within the bitstream can be combined. For example, a single encoding operation may be performed to encode the non-zero value coefficients and the dimensional information to the bitstream.

In some implementations, the technique 1200 may include encoding a syntax element indicating whether a bounding box was used for encoding the block to the bitstream. For example, the syntax element may be a binary flag. The binary flag may be included in a block header for the block being encoded, an image or video frame header for the image or video frame which includes the block being encoded, or another portion of the bitstream.

In some implementations, the quantized transform coefficients of the current block can be processed against each of multiple candidate scan orders to identify the scan order to use for identifying the bounding box. For example, it may be the case that different candidate scan orders may result in a different shape, size, and/or location within the current block of the bounding box. Accordingly, it follows that different candidate scan orders may result in a different total number of coefficients (both non-zero value and zero value) which are enclosed by the resulting bounding boxes. The scan order to use for identifying the bounding box is thus identified based on groupings of the non-zero value coefficients within a two-dimensional matrix representation corresponding to the current block. Further, the scan order ultimately identified for use in identifying the bounding box is identified as the candidate scan order resulting in a tightest grouping of the non-zero value coefficients. The shape and size of the bounding box may thus be based on the arrangement of the non-zero value coefficients according to that tightest grouping thereof.

In some such implementations, processing the quantized transform coefficients of the current block against the multiple candidate scan orders can include, for each of the candidate scan orders, identifying a candidate bounding box using that candidate scan order and determining a total number of coefficients enclosed within the candidate bounding box. The candidate bounding box having a lowest one of the total numbers of coefficients may then be selected or otherwise identified as the bounding box for the current block.

In some such implementations, processing the quantized transform coefficients of the current block against the multiple candidate scan orders can include identifying a candidate bounding box using a first candidate scan order and determining a total number of coefficients enclosed within the candidate bounding box. The candidate bounding box itself or indication representative or otherwise indicative of the candidate bounding box may then be stored as the pending best candidate bounding box. The remaining candidate scan orders are then iterated against individually. For each new bounding box identified during this process, a determination can be made as to whether the new bounding box encloses a lower total number of coefficients than the currently stored bounding box. Where the new bounding box does enclose such a lower total number of coefficients, the currently stored bounding box may be evicted from storage and replaced with the new bounding box. Where the new bounding box does not enclose such a lower total number of coefficients, the new bounding box may be discarded. This process may repeat until each of the available candidate scan orders has been iterated through, and the bounding box stored at the end of the process may then be selected or otherwise identified as the bounding box for the current block.

In some implementations, identifying the bounding box may include using a reference bounding box previously identified for a previously encoded block or image or video frame. For example, the reference bounding box may be a bounding box previously identified for a neighbor block of the current block being encoded. In another example, the reference bounding box may be a bounding box of a collocated block within a reference image or reference video frame, such as a reference image or reference video frame used for inter-prediction of the current block or for another block included in the same image or video frame as the current block. In some implementations, using the reference bounding box may include encoding a differential to the bitstream, in which the differential signals to the decoder how to use the reference bounding box to represent a bounding box for the current block. In some implementations, the reference bounding box itself is signaled within the bitstream. In some implementations, the differential and the reference bounding box are both signaled within the bitstream.

In some implementations, there may be multiple reference bounding boxes available for use during the encoding of the current block. In some such implementations, a buffer may be used to store data corresponding to one or more reference bounding boxes. For example, reference bounding boxes may be stored for some or all reference frames stored in a reference frame buffer available for encoding the current block. In another example, reference bounding boxes may be stored for some or all neighbor blocks of the current block. In yet another example, reference bounding boxes may be stored for some or all reference frames and for some or all neighbor blocks.

In some implementations in which multiple reference bounding boxes are available for use during the encoding of the current block, identifying the bounding box for use with the current block may include iterating through some or all of the multiple reference bounding boxes to identify an optimal one of the reference bounding boxes to use for encoding the current block. For example, the current block can be iterated through (e.g., using scan order processing or another processing for scanning through the coefficients thereof) to identify the non-zero coefficients of the current block within some or all of the multiple reference bounding boxes. The reference bounding box which encloses each of the non-zero value coefficients of the current block and a lowest total number of coefficients of the current block can then be selected or otherwise identified as the bounding box for use with the current block.

In some implementations, identifying the bounding box for use with the current block may include identifying the bounding box other than by using a scan order. For example, the bounding box may be identified by iterating through different bounding box candidates defined for use with the encoder, rather than identified from encoding previous blocks. For example, one or more bounding box candidates of different sizes, shapes, and/or positions within the current block may be processed against the quantized transform coefficients of the current block. For example, a bounding box candidate may enclose the top-left-most M×N block of the quantized transform coefficients. In such a case, M and N are each less than a total width or height of the current block. In some such cases, the values of M and N may be different. Other examples based on size, shape, and/or position are possible.

In some such implementations, processing the quantized transform coefficients of the current block against the bounding box candidates can include, for each of the bounding box candidates, determining a total number of coefficients enclosed within the candidate bounding box. The bounding box candidate having a lowest one of the total numbers of coefficients may then be selected or otherwise identified as the bounding box for the current block. In some such implementations, in the event that two or more of the bounding box candidates share the lowest total number of coefficients, other criteria may be used to select or otherwise identify one of those bounding box candidates as the bounding box for use with the current block. For example, the bounding box candidate having the smaller size and/or the bounding box candidate located most closely to a DC coefficient of the current block may be selected or otherwise identified as the bounding box for the current block. In some such implementations, the first bounding box candidate to meet a threshold score may be selected or otherwise identified as the bounding box for use with the current block. For example, the threshold score may correspond to or otherwise be based on a compression throughput goal, a maximum total number of coefficients which may be enclosed within a bounding box, and/or other criteria.

In some such implementations, processing the quantized transform coefficients of the current block against the bounding box candidates can include using machine learning. For example, a machine learning model can be trained to identify an optimal size, shape, and/or position of the two-dimensional matrix representation corresponding to the bounding box, such as by analyzing a number of bounding boxes identified for previously encoded blocks.

In some implementations, identifying the bounding box for use with the current block may include determining whether to use a reference bounding box in connection with the encoding of the current block. For example, determining whether to use a reference bounding box in connection with the encoding of the current block may include determining an amount of motion within the current block. For example, where the amount of motion meets a threshold, it may indicate that too much information about the reference block from which the reference bounding box would be used is different from the information about the current block. In such a case, the reference bounding box may not be used. The reference bounding box may be a lone reference bounding box available for use during the encoding of the current block. Alternatively, the reference bounding box may be one of multiple reference bounding boxes available for use during the encoding of the current block.

Referring next to FIG. 13, a flowchart diagram of the example of the technique 1300 for decoding an encoded image or video block using sparse matrix representation using a boundary of non-zero coefficients is shown. At 1302, dimensional information of a bounding box is decoded from an encoded bitstream.

At 1304, syntax elements representative of non-zero value coefficients encoded to the encoded bitstream are decoded from the encoded bitstream using the dimensional information. For example, using the dimensional information to decode the syntax elements can include using the dimensional information to determine locations of the non-zero value coefficients within the block being decoded.

At 1306, the syntax elements are dequantized to produce transform coefficients. The transform coefficients are arranged in a two-dimensional matrix corresponding to the block being decoded.

At 1308, the transform coefficients are inverse transformed to produce decoded pixel data. The decoded pixel data may be, include, or otherwise refer to pixel values of before or after the reconstruction of a prediction residual, if a prediction residual is involved in the decoding.

At 1310, the decoded pixel data is output for storage or display. For example, outputting the decoded pixel data for storage or display can include rendering the decoded pixel data as an image within a web page. In another example, outputting the decoded pixel data for storage or display can include outputting an output video stream including the decoded pixel data to a device for playing the video stream.

In some implementations, the technique 1300 may include decoding a syntax element indicating whether a bounding box was used for encoding the encoded block from the bitstream. For example, the syntax element may be a binary flag. The binary flag may be included in a block header for the block being encoded, an image or video frame header for the image or video frame which includes the block being encoded, or another portion of the bitstream. In some such implementations, the value of the syntax element indicating whether the bounding box was used may be checked as a pre-processing step, such as before other operations described with respect to the technique 1300 are performed. For example, responsive to a determination that the syntax element indicates that the bounding box was not used for encoding the encoded block, some operations described with respect to the technique 1300 may be skipped. In some such implementations, responsive to a determination that the syntax element indicates that the bounding box was not used for encoding the encoded block, the operations for decoding syntax elements representative of dimensional information and/or the operations for using the dimensional information for decoding the encoded block may be skipped.

The aspects of encoding and decoding described above illustrate some examples of encoding and decoding techniques and hardware components configured to perform all or a portion of those examples of encoding and/or decoding techniques. However, it is to be understood that encoding and decoding, as those terms are used in the claims, could mean encoding, decoding, transforming, or another processing or changing of data.

The word 'example_ is used herein to mean serving as an example, instance, or illustration. Any aspect or design described herein as 'example_ is not necessarily to be construed as being preferred or advantageous over other aspects or designs. Rather, use of the word 'example_ is intended to present concepts in a concrete fashion. As used in this application, the term 'or_ is intended to mean an inclusive 'or_ rather than an exclusive 'or._ That is, unless specified otherwise or clearly indicated otherwise by the context, the statement 'X includes A or B_ is intended to mean any of the natural inclusive permutations thereof. That is, if X includes A; X includes B; or X includes both A and B, then 'X includes A or B_ is satisfied under any of the foregoing instances. In addition, the articles 'a_ and 'an_ as used in this application and the appended claims should generally be construed to mean 'one or more,_ unless specified otherwise or clearly indicated by the context to be directed to a singular form. Moreover, use of the term 'an implementation_ or the term 'one implementation_ throughout this disclosure is not intended to require the same implementation unless described as such.

All or a portion of the implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations, examples, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding a current block of image or video data, the method comprising:
    transforming data of the current block to produce transform coefficients;
    quantizing the transform coefficients to produce quantized transform coefficients, wherein the quantized transform coefficients include non-zero value coefficients and zero value coefficients;
    identifying, according to a first scan order, a first bounding box which encloses a first total number of coefficients, wherein the first total number of coefficients includes at least each of the non-zero value coefficients and a first number of the zero value coefficients;
    identifying, according to a second scan order, a second bounding box which encloses a second total number of coefficients, wherein the second total number of coefficients also includes at least each of the non-zero value coefficients and a second number of the zero value coefficients;
    determining that the first total number of coefficients is lower than the second total number of coefficients; and
    responsive to determining that the first total number of coefficients is lower than the second total number of coefficients, encoding, to a bitstream, data representative of the first total number of coefficients and dimensional information of the bounding box, wherein the dimensional information is configured to signal the bounding box to a decoder.

2. The method of claim 1, wherein the first bounding box is identified based on locations of the non-zero value coefficients within a two-dimensional matrix representation corresponding to the current block along the first scan order, wherein the second bounding box is identified based on locations of the non-zero value coefficients within the two-dimensional matrix representation along the second scan order, and wherein the first bounding box is smaller than the second bounding box.

3. The method of claim 2, wherein a location of a first end of block position along the first bounding box is different from a location of a second end of block position along the second bounding box.

4. The method of claim 1, further comprising:
    encoding, to the bitstream, a syntax element configured to signal a use of the bounding box for encoding the current block to the decoder.

5. The method of claim 1, wherein at least one of the first bounding box or the second bounding box has a non-rectangular shape.

6. A method for encoding a current block of image or video data, the method comprising:
    transforming data of the current block to produce transform coefficients;
    quantizing the transform coefficients to produce quantized transform coefficients, wherein the quantized transform coefficients include non-zero value coefficients and zero value coefficients;
    iterating through the quantized transform coefficients according to a scan order to identify locations of the non-zero value coefficients within a two-dimensional matrix representation corresponding to the current block;
    identifying, based on the locations of the non-zero value coefficients within the two-dimensional matrix representation, a bounding box which encloses a total number of coefficients including each of the non-zero value coefficients and a number of the zero value coefficients; and
    encoding, to a bitstream, data representative of the total number of coefficients and of dimensional information of the bounding box.

7. The method of claim 6, further comprising:
    identifying groupings of the non-zero value coefficients within the two-dimensional matrix representation according to each of a plurality of candidate scan orders; and
    identifying, as the scan order, a candidate scan order of the plurality of candidate scan orders used to identify a tightest grouping of the groupings.

8. The method of claim 7, wherein a shape of the bounding box and a size of the bounding box are based on an arrangement of the tightest grouping of the groupings, wherein the dimensional information represents at least one of the shape of the bounding box or the size of the bounding box.

9. The method of claim 6, wherein the bounding box has a non-rectangular shape.

10. The method of claim 6, wherein the dimensional information of the bounding box is represented within the bitstream using one or more coded syntax element values.

11. A method for encoding a current block of image or video data, the method comprising:
   transforming data of the current block to produce transform coefficients;
   quantizing the transform coefficients to produce quantized transform coefficients, wherein the quantized transform coefficients are arranged in a two-dimensional matrix representation;
   identifying a bounding box which encloses a first set of the quantized transform coefficients within the two-dimensional matrix representation, wherein the first set of the quantized transform coefficients includes each non-zero value coefficient of the quantized transform coefficients, wherein a second set of the quantized transform coefficients located outside of the bounding box within the two-dimensional matrix representation is limited to zero-value coefficients; and
   encoding, to a bitstream, the first set of the quantized transform coefficients and dimensional information of the bounding box.

12. The method of claim 11, wherein identifying the bounding box which encloses the first set of the quantized transform coefficients within the two-dimensional matrix representation comprises:
   identifying the bounding box based on locations of non-zero value coefficients of the quantized transform coefficients, wherein the non-zero value coefficients are identified by iterating through the quantized transform coefficients according to a scan order.

13. The method of claim 12, wherein the scan order is one of a plurality of candidate scan orders available for encoding the current block, wherein identifying the bounding box based on the locations of non-zero value coefficients of the quantized transform coefficients comprises:
   identifying bounding box candidates for at least some candidate scan orders of the plurality of candidate scan orders;
   determining that a first bounding box candidate identified for a first candidate scan order encloses a lower total number of coefficients than a second bounding box candidate identified for a second candidate scan order; and
   responsive to the determining, identifying the first bounding box candidate as the bounding box.

14. The method of claim 12, further comprising:
   determining the dimensional information of the bounding box based on the locations of the non-zero value coefficients of the quantized transform coefficients.

15. The method of claim 14, wherein the dimensional information represents one or more of a shape of the bounding box, a size of the bounding box, or a position of the bounding box within the two-dimensional matrix representation.

16. The method of claim 11, wherein identifying the bounding box which encloses the first set of the quantized transform coefficients within the two-dimensional matrix representation comprises identifying, for use in encoding the current block, a reference bounding box used for encoding a previously encoded block,
   wherein encoding the first set of the quantized transform coefficients and the dimensional information of the bounding box comprises encoding, to the bitstream, a differential indicating to use the reference bounding box for decoding the current block.

17. The method of claim 16, wherein a buffer stores data representative of a plurality of reference bounding boxes, wherein identifying the reference bounding box used for encoding the previously encoded block comprises:
   iterating through the plurality of reference bounding boxes to identify total numbers of coefficients enclosed by each of the reference bounding boxes, wherein the reference bounding box is identified responsive to a determination that it encloses a lowest total number of coefficients.

18. The method of claim 16, further comprising:
   identifying the reference bounding box for use in encoding the current block responsive to a determination that an amount of motion within current block does not meet a threshold.

19. The method of claim 11, further comprising:
   encoding, to the bitstream, an adaptive bit indicative of a first run of zero values of the second set of the quantized transform coefficients;
   encoding, to the bitstream, a syntax element indicative of a second run of zero values of the second set of the quantized transform coefficients; and
   encoding, to the bitstream, a Golomb representation of a third run of zero values of the second set of the quantized transform coefficients,
   wherein the second run of zero values includes a greater number of the zero value coefficients than the first run of zero values, wherein the third run of zero values includes a greater number of the zero value coefficients than the second run of zero values.

20. The method of claim 11, wherein the first set of the quantized transform coefficients is limited to the non-zero value coefficients of the quantized transform coefficients.

* * * * *